R. LA FRANCE.
MEANS FOR MAKING BOTTLES.
APPLICATION FILED JUNE 12, 1919.

1,404,206.

Patented Jan. 24, 1922.
4 SHEETS—SHEET 2.

INVENTOR
Richard La France
BY J. F. Rule
HIS ATTORNEY

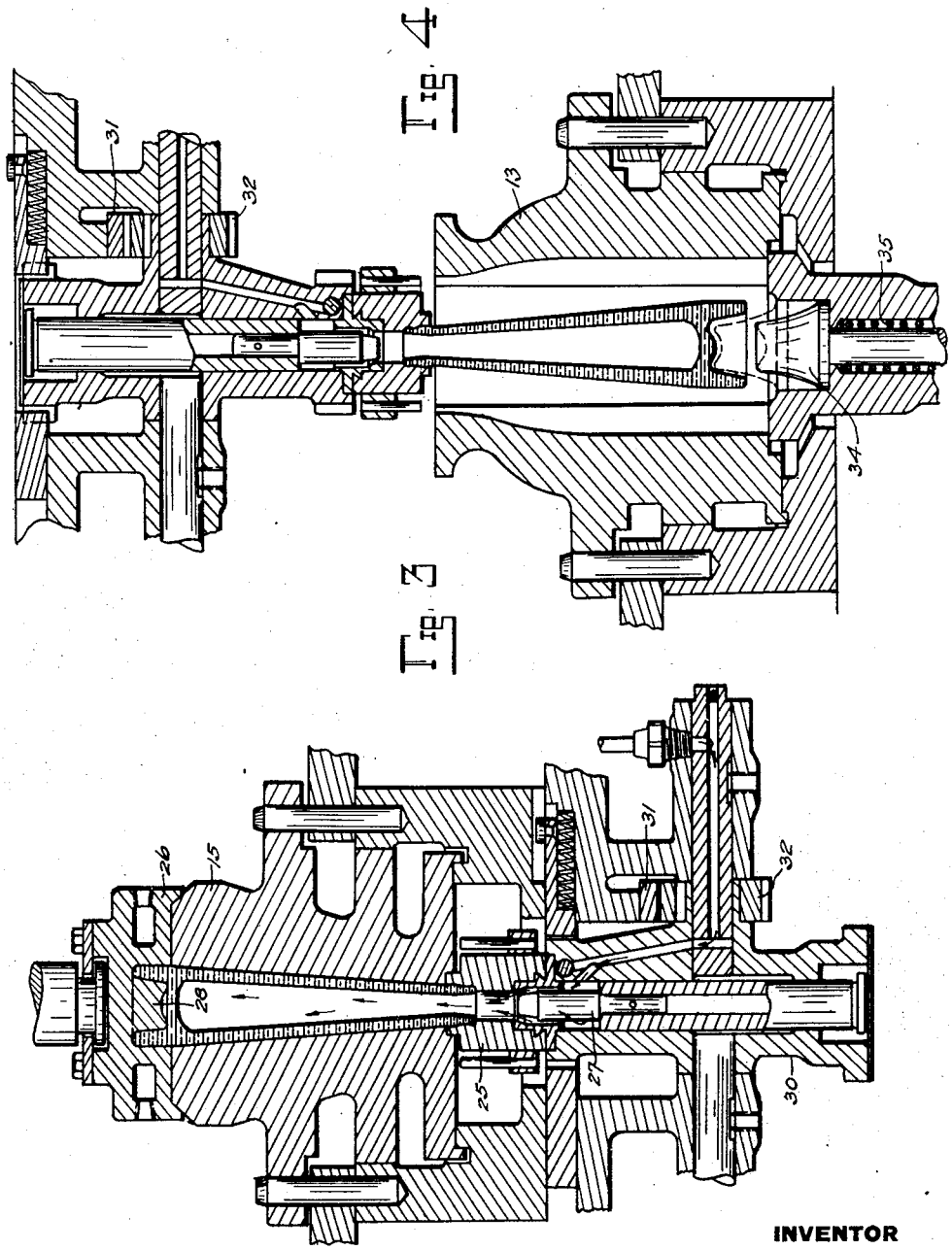

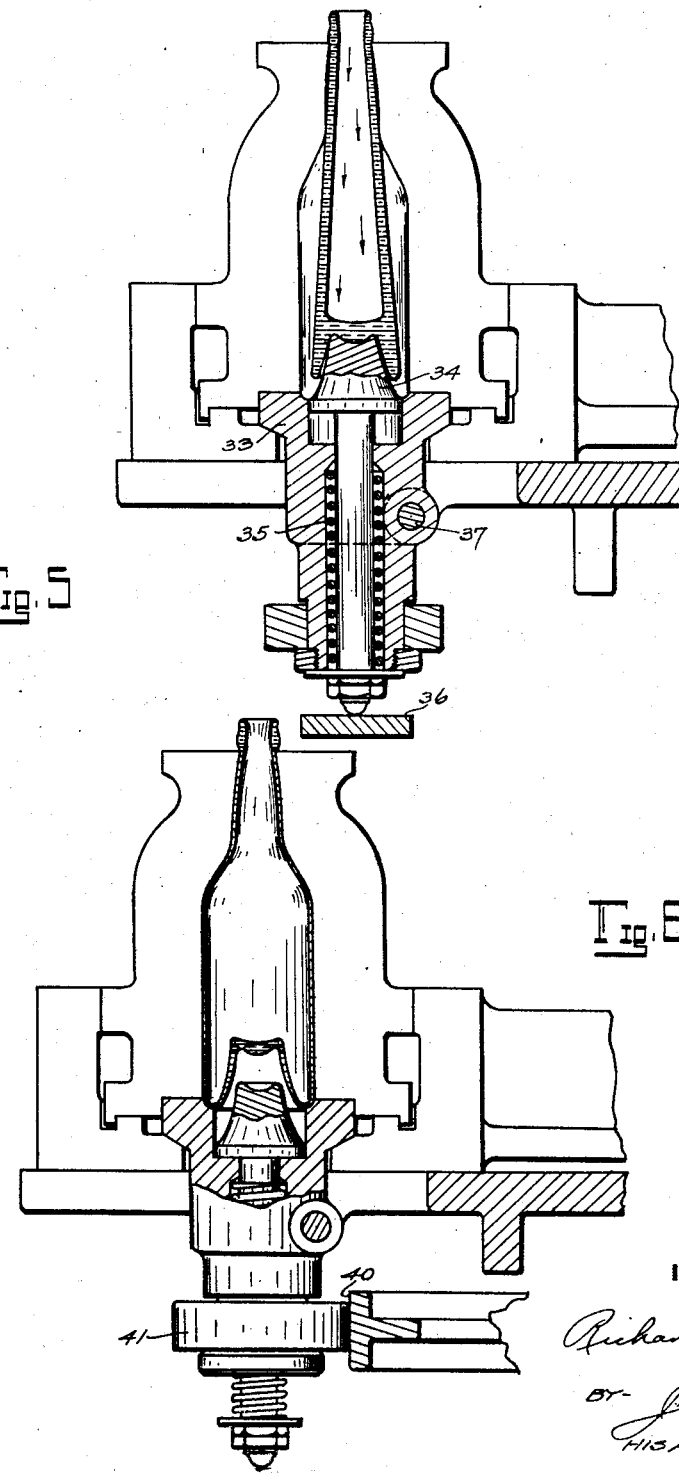

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR MAKING BOTTLES.

1,404,206.  Specification of Letters Patent.  Patented Jan. 24, 1922.

Application filed June 12, 1919. Serial No. 303,544.

*To all whom it may concern:*

Be it known that I, RICHARD LA FRANCE, a citizen of the United States, residing at Toledo, in the county of Lucas and State of Ohio, have invented new and useful Improvements in Means for Making Bottles, of which the following is a specification.

My invention relates to mechanism for making bottles or similar glass articles, and more particularly to means for forming a bottle having a re-entrant bottom. The principles of my invention may be embodied in various types of mechanism, and as herein shown, the invention is adapted for use with an automatic bottle blowing machine of the type disclosed in the co-pending application of Joseph B. Graham, Serial Number 201,644, filed November 12, 1917. Such machine comprises an inverted parison mold to receive the charge of glass, a neck mold beneath and in register with the parison mold in which the neck of the bottle is formed. The blank is partially blown in the parison mold; the latter then opens and the neck mold is inverted to swing the parison downward into the open finishing mold, which then closes around the bare blank and the bottle is blown to its finished shape. The finishing mold sections are later separated, leaving the bottle supported on the mold bottom, which is then tilted to discharge the bottle.

In accordance with the present invention, the bottom of the bottle is partially formed in the parison mold by an end plate having a central projection surrounded by an annular space. The plastic glass is forced into this space, thereby forming an annular extension on the bottom end of the blank. The bottom piece for the finishing mold comprises a central section or plunger which, while the bottle is being blown, is projected upwardly within the body of the finishing mold so as to enter the cavity formed in the bottom end of the parison. After the bottle is blown in the finishing mold said bottom is withdrawn to permit the bottle to drop when the mold bottom is tilted.

Other features and advantages of the invention will appear hereinafter.

In the accompanying drawings:

Figure 3 is a sectional elevation of the parison mold and the rotatable head carrying the neck mold.

Figure 4 is a view showing said head and neck mold inverted and the parison suspended from the neck mold between the open blow mold sections.

Figure 5 shows the blow mold closed around the parison and the movable bottom section moved upward.

Figure 6 is a similar view showing the bottle blown to its finished form and the bottom section withdrawn.

Figure 1:
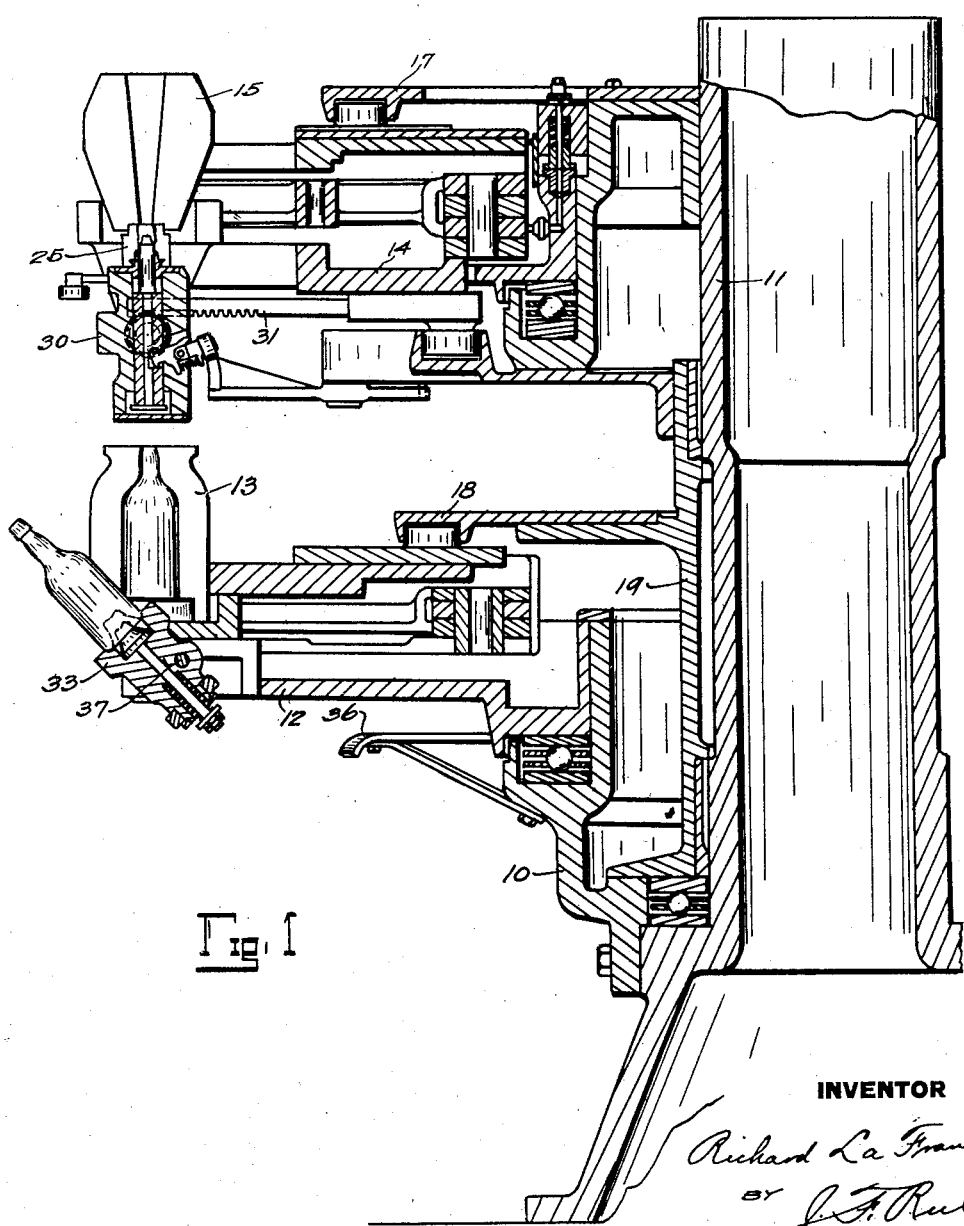
Figure 1 is a sectional elevation of a portion of a machine constructed in accordance with my invention.

The machine comprises a stationary frame 10 including a vertical column 11. A carriage, comprising a lower section 12 carrying finishing molds 13 and an upper section 14 carrying blank molds 15, is mounted for step by step rotation about the column 11. The opening and closing of the blank molds 15 is controlled by a stationary cam plate 17. The opening and closing of the finishing molds 13 is controlled by a cam 18 on an oscillating cam frame 19 which advances with the mold carriage during each forward movement of the latter and then returns while the carriage is stationary. The means for oscillating the frame 19 and driving the carriage, comprises a continuously rotating driver 20 connected by a pin 21 to a block 22 mounted to slide in a radial arm 23 on the frame 19. As the driver 20 rotates, the block 22 carried therewith reciprocates lengthwise of the arm 23 and oscillates the latter. During its forward movement (namely, in a clockwise direction, Fig. 2) the arm 23 is connected by a locking pin 24 to the mold carriage, which pin is withdrawn when the arm is at the limit of its forward movement (Fig. 2) to disconnect it from the carriage while the arm returns, so that a step by step movement is imparted to the carriage.

As each blank mold 15 is brought to the charging station a charge of glass is introduced through the upper open end thereof and is forced downward (by means not shown) so that a portion of the glass enters the neck mold 25 and forms the neck of the bottle. A head 26 (Fig. 3) is then brought down on top of the blank mold, and the plunger 27 (which forms an initial blow opening in the neck of the bottle) is withdrawn and air under pressure admitted to blow the parison to hollow form. The head 26 is shaped to partially form the bottom of the bottle and for this purpose is provided with a central projection 28 surrounded by an annular space into which the glass is forced by the air pressure.

Figure 2:
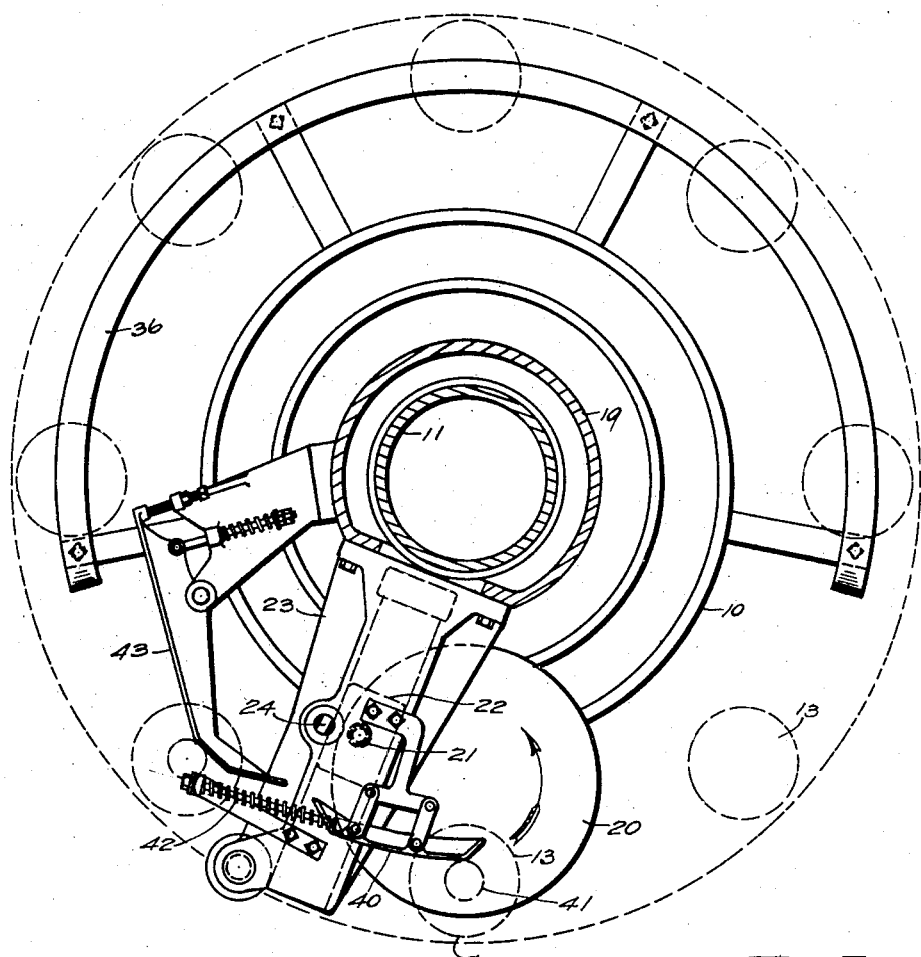
Figure 2 is a sectional plan view.

After the parison is thus formed the blank mold sections are separated, leaving the bare blank supported by and projecting upward from the neck mold. The blowing head 30 which carries the neck mold is now inverted by means of a rack 31 and a pinion 32 on the axis of the head 30. The bare parison is thus swung downwardly to a position between the open sections of the blow mold 13, as shown in Figure 4. The blow mold now closes, as indicated in Figure 5, in which position the mold sections surround a mold bottom 33. This mold bottom comprises a central vertically movable section or plunger 34, which is moved downward by gravity, assisted by a spring 35, to the Figure 4 position, and is moved upward to the Figure 5 position by a cam 36 on the frame 10. The bottom section 34 is moved upward after the blow mold closes, and enters the space which was formed in the parison by the projection 28. After the blow mold has closed and the section 34 moved up to operative position, the bottle is blown to its finished shape (Fig. 6). The cam 36, as shown in Figure 2, is of sufficient extent to hold the mold bottom section 34 up until the glass has hardened sufficiently to retain its shape. When a blow mold reaches the position C (Fig. 2) the mold sections are separated, but the mold bottom 33 is prevented from tilting immediately by a cam 40 on the arm 23, which cam engages a roll 41 on the tilting mold bottom. The arm 23 now swings to the right carrying with it the cam 40 which is shaped to permit the mold bottom 33 to gradually tilt to the Figure 1 position and permit the bottle to drop. A spring 42 permits the cam to yield under excessive pressure. The mold bottom 33 is returned by a cam 43 which holds it up while the mold sections are brought together to enclose another parison. The bottom is thus interlocked with the mold and held up until the mold is again opened.

Variations may be resorted to without departing from the spirit and scope of my invention.

What I claim is:

1. The combination of a blank mold having an annular recess forming an extension of the mold cavity, a blow mold having a bottom section projecting into one end of the mold cavity and providing an annular space surrounding said section, said annular space being of substantially greater external diameter and less internal diameter than the corresponding dimensions of the blank mold recess, and means to form a blank in the blank mold and blow it in the blow mold.

2. A mold comprising in combination, a body portion and a bottom relatively movable for opening and closing the mold, said bottom having a central section normally projecting upward into the mold cavity and providing an annular space between said section and the side walls of the mold, and means for withdrawing said projection while said body portion and bottom are in mold closing position.

3. The combination of a blow mold comprising a bottom section normally projecting upward within the mold cavity and of smaller diameter than said cavity, whereby an annular space is provided around said section, means for forming a parison of glass with an annular projection at one end, of substantially greater internal diameter and smaller external diameter than said annular space, means for introducing said parison within the blow mold with the annular projection within said annular space, and means to blow the parison in said mold and thereby form a bottle having a concave or dished bottom projecting upwardly within the body of the bottle.

4. The method of forming a bottle from molten glass, which consists in introducing a gob of glass within a mold provided with a mold cavity having an annular extension at one end thereof, blowing said gob to hollow form within the mold and forcing the glass within said extension, introducing the parison thus formed into a finishing mold, the mold cavity of which includes an annular extension to receive the annular extension of the parison, the internal and external diameters of the parison extension being respectively larger and smaller than the corresponding diameters of said extension of the finishing mold cavity, and then blowing the blank to the form of a bottle with said annular extension expanded to hollow form.

5. In a bottle blowing machine, the combination of a blow mold comprising separable body sections and a tilting mold bottom, said bottom comprising a central section projecting upward within the mold cavity, and means to draw said section downward away from the blown bottle to permit the latter to be discharged by the tilting of the mold bottom.

6. The combination with a mold, of a tilting mold bottom therefor comprising a central section normally projected upward within the mold cavity and around which the article is blown, means to disengage the mold from the article formed therein while the latter is supported on said bottom, and means to withdraw said projection to disengage it from the blown article and permit the latter to be discharged by the tilting of said bottom.

7. In a machine for making bottles, a blow mold having a cylindrical mold cavity section for forming the body of the bottle and a frusto-conical bottom section projecting upwardly within said cavity to form the bottom of the bottle, said bottom section at its base being of substantially smaller diameter than the surrounding mold cavity, means for blowing the bottle, and means for withdrawing said bottom section downwardly out of the bottle to permit the discharge of the bottle.

8. In a bottle blowing machine, the combination with a rotary mold carriage, of a mold thereon, a bottom section for the mold movable into position to project within the mold cavity and form a re-entrant bottom on the bottle with the side walls of the bottle surrounding and spaced from the side walls of said bottom section and said reentrant bottom of the bottle, a cam to hold said bottom in said position during a portion of the travel of the carriage, and means to withdraw said section from the bottle prior to the discharge of the bottle from the machine.

9. In a bottle blowing machine, the combination with a rotary mold carriage, of a blow mold thereon comprising separable body sections, a tiltable bottom, the latter comprising a central section movable up and down within the mold cavity, a cam controlling said up and down movements, and a separate cam controlling the tilting movements of the mold bottom.

10. In a bottle blowing machine, the combination with a rotary mold carriage, of a blow mold thereon comprising separable body sections, a tiltable bottom, the latter comprising a central section movable up and down within the mold cavity, a cam controlling said up and down movements, and a separate cam controlling the tilting movements of the mold bottom, means for opening the body portion of the mold, leaving the blown bottle supported on said bottom while the latter is held up by its cam, the latter arranged to slowly tilt said bottom to discharge the bottle, the cam controlling said central section being arranged to cause said section to be withdrawn prior to the discharge of the bottle.

Signed at Toledo, in the county of Lucas and State of Ohio, this 9th day of June, 1919.

RICHARD LA FRANCE.